(12) United States Patent
Hunyadi Murph et al.

(10) Patent No.: US 11,884,539 B2
(45) Date of Patent: Jan. 30, 2024

(54) SYSTEMS AND METHODS FOR MANUFACTURING NANO-SCALE MATERIALS

(71) Applicant: SAVANNAH RIVER NUCLEAR SOLUTIONS, LLC, Aiken, SC (US)

(72) Inventors: Simona E. Hunyadi Murph, North Augusta, SC (US); Vahid Majidi, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 449 days.

(21) Appl. No.: 16/892,711

(22) Filed: Jun. 4, 2020

(65) Prior Publication Data

US 2021/0380405 A1 Dec. 9, 2021

(51) Int. Cl.
| | | |
|---|---|---|
| *B82B 3/00* | (2006.01) | |
| *B29C 64/314* | (2017.01) | |
| *B33Y 10/00* | (2015.01) | |
| *B29C 64/321* | (2017.01) | |
| *B33Y 30/00* | (2015.01) | |
| *B82Y 30/00* | (2011.01) | |

(52) U.S. Cl.
CPC .......... *B82B 3/0004* (2013.01); *B29C 64/314* (2017.08); *B29C 64/321* (2017.08); *B33Y 10/00* (2014.12); *B33Y 30/00* (2014.12); *B82Y 30/00* (2013.01)

(58) Field of Classification Search
CPC ................................................ B01L 3/502776
See application file for complete search history.

(56) References Cited

U.S. PATENT DOCUMENTS

| 9,050,655 B2 | 6/2015 | Chou et al. |
| 9,375,790 B2 | 6/2016 | Murphy et al. |
| 9,381,477 B2 | 7/2016 | Karnik et al. |
| 2006/0056904 A1 | 3/2006 | Haselton et al. |
| | (Continued) | |

FOREIGN PATENT DOCUMENTS

WO    WO 2019/055360    3/2019

OTHER PUBLICATIONS

Weitz et al. ("Controllable Monodisperse Multiple Emulsions", Angew. Chem. Int. Ed. 2007, 46, p. 8970-8974) (Year: 2007).*

(Continued)

*Primary Examiner* — Timothy Kennedy
*Assistant Examiner* — Ariella Machness
(74) *Attorney, Agent, or Firm* — Dority & Manning, P.A.

(57) ABSTRACT

Methods and systems for high-speed production of nanoparticles with very high product yields are described. Systems utilize concentric micro-scale capillaries arranged to define nanoparticle formation regions that lie along predetermined length(s) of the capillaries. Flow through the formation regions can be laminar during a formation protocol. The system can include on-line analytical tools for real time characterization of products or intermediates. Systems include an additive manufacturing-type deposition at the terminus of the formation section. The deposition area includes a print head and a print bed and provides for random or patterned deposition of nanoparticles. The print head and/or the print bed can be capable of motion in one or more degrees of freedom relative to one another.

20 Claims, 12 Drawing Sheets

(56) References Cited

U.S. PATENT DOCUMENTS

| | | | | |
|---|---|---|---|---|
| 2012/0141796 | A1* | 6/2012 | Adamson | B01J 13/04 264/4.1 |
| 2015/0352787 | A1 | 12/2015 | Humbert et al. | |
| 2018/0272306 | A1 | 9/2018 | Ganan-Calvo et al. | |
| 2019/0143584 | A1 | 5/2019 | Hanrath et al. | |

OTHER PUBLICATIONS

Santos et al. "Core/Shell Nanocomposites Produced by Superfast Sequential Microfluidic Nanoprecipitation", Nano Letters 2017, 17, p. 606-614 (Year: 2017).*

LibreTexts libraries (https://phys.libretexts.org/Bookshelves/College_Physics/Book%3A_College_Physics_(OpenStax)/12%3A_Fluid_Dynamics_and_Its_Biological_and_Medical_Applications/12.04%3A_Viscosity_and_Laminar_Flow_Poiseuilles) (Year: 2022).*

Santos et al. "Core/Shell Nanocomposites Produced by Superfast Sequential Microfluidic Nanoprecipitation—Supplemental Information", Nano Letters 2017, 17, p. 606-614 (Year: 2017).*

Weitz et al. "Controllable Monodisperse Multiple Emulsions", Angew. Chem. Int. Ed. 2007, 46, p. 8970-8974 (Year: 2017).*

Kianvashrad et al. "Optimizing microfluidic preparation parameters of nanosuspension to evaluate stability in nanoprecipitation of stable-iodine (127I)", SN Applied Sciences, 2019, 1, 1054 (Year: 2019).*

Benyahia et al. ("Continuous synthesis of PVP stabilized biocompatible gold nanoparticles with a controlled size using a 3D glass capillary microfluidic device", Chemical Engineering Science 171 (2017) p. 233-243) (Year: 2017).*

Abate et al. ("Printed droplet microfluidics for on demand dispensing of picoliter droplets and cells", PNAS 2017, 114, 33, p. 8728-8733) (Year: 2017).*

Gavriilidis et al. ("Synthesis of silver nanoparticles in a microfluidic coaxial flow reactor", RSC Adv., 2015, 5, 95585) (Year: 2015).*

Abou-Hassan et al. ("Synthesis of Goethite by Separation of the Nucleation and Growth Processes of Ferrihydrite Nanoparticles Using Microfluidics", Angew. Chem. 2009, 121, 2378-2381) (Year: 2009).*

Abou-Hassan et al. ("Multistep Continuous-Flow Microsynthesis of Magnetic and Fluorescent γ-Fe2O3@SiO2 Core/Shell Nanoparticles" Angew. Chem. 2009, 121, 7316-7319) (Year: 2009).*

Cabeza, V.S. "Ch. 17—High and Efficient Production of Nanomaterials by Microfluidic Reactor Approaches" *Adv. in Microfluidics—New Appl.in Biol., Energ., and Mater. Sci.* InTech (2016) pp. 385-410.

Chang, et al. "Synthesis and post-processing of nanomaterials using microreaction technology" *J. Nanopart. Res.* 10 (2008) pp. 965-980.

Robertson, K. "Using flow technologies to direct the synthesis and assembly of materials in solution" *Chem. Cent. J.* 11 (2017) pp. 1-18.

Thomée, E. "Microfluidic Nanoparticle Synthesis: A short review" *Elveflow* (2017) pp. 1-7.

Vyatskikh, et al. "Additive manufacturing of 3D nano-architected metals" *Nat. Comm.* 9:593 (2018) pp. 1-8.

* cited by examiner

SYSTEMS AND METHODS FOR MANUFACTURING NANO-SCALE MATERIALS

FEDERAL RESEARCH STATEMENT

This invention was made with Government support under Grant No. DE-AC09-08SR22470, awarded by the U.S. Department of Energy. The Government has certain rights in the invention.

BACKGROUND

Nano-scale structures are an important class of materials with a multitude of beneficial properties and potential applications including in medical, catalysis, optoelectronic, imaging, and sensing fields, among many others. Formation technologies for nano-scale structures generally rely on batch synthesis methods. Unfortunately, current synthesis methods do not allow for exquisite control of the reaction environment at a scale commensurate with the product size. As a result, the quality of product can vary greatly from batch to batch, and formation of high quality essentially identical and/or complex nano-scale structures in useful amounts is difficult, if not impossible. In addition, current formation methods require large quantities of reactants with low product yield, leading to large waste volumes and increased formation costs.

Additive manufacturing refers to any method for creating an object in which products are formed by use of a continuous deposition process. Additive manufacturing technologies have been developed that provide a pathway for manufacturing macroscopic complex objects in a cost effective and rapid manner. 3-D printing additive manufacturing techniques utilize computer-aided design to deposit formation material on a print bed, typically layer-by-layer, to form a final product. Originally, 3-D printing was limited to rapid prototyping, but advances in the field have allowed expansion of the technology into product production in the medical, automotive, and even consumable fields, among many others.

What are needed in the art are systems and methods that can produce high quality nano-scale materials. A nano-scale material production system based on additive manufacturing concepts that can rapidly and continuously form high-quality products with high product yield would be of great benefit in the art.

SUMMARY

According to one embodiment, disclosed is a system for manufacturing nano-scale materials (also referred to herein as nanoparticles and nano-scale structures). A system can include a plurality of capillaries, each of which having an inside diameter of about 1500 micrometers or less. The capillaries include at least two capillaries that are concentric with one another, i.e., one capillary inside the other. The outer diameter of the inner capillary is smaller than the inner diameter of the outer capillary such that there is a flow space between the two. The inner capillary has an end that is within the outer capillary and a mixing region extends from this end of the inner capillary and along a length of the outer capillary. A system can also include first and second pumps configured to pump fluids through the flow space and the inner capillary, respectively, and thence through the mixing region. The pumps are configured such that flow through the mixing region can be laminar flow. A system can also include a print head at the terminus of the capillaries (i.e., at the end of the last of the plurality of capillaries) and a print bed configured to receive a nano-scale material upon exit from the print head.

Also disclosed are methods for manufacturing nano-scale materials. A method can include flowing a first fluid carrying a first reagent or a mixture of reagents through a flow space of a first capillary and flowing a second fluid carrying a second reagent or mixture of reagents through the interior of a second capillary, the second capillary being concentric, and within the first capillary, with the flow space being as defined above. The second capillary has an end that is within the first capillary, and after passing this end, the first and second fluids pass through a mixing region of the first capillary with a laminar flow pattern. Within the mixing region, the first and second reagents interact to form nano-scale materials. The method can also include delivering the nano-scale materials from a print head to a print bed.

The methods and systems can include additional features (e.g., additional multiple concentric capillaries in parallel or series) that can provide for additional modification of the products, e.g., surface functionalization, capping, size control, shape control, etc. The system can include features such as external tubing, heaters, control systems, etc. that can provide for control of reaction parameters (e.g., temperature, pressure, flow rates, mixing profiles, reagent's diffusion rates, thermal and mass transfer) at predetermined locations and time periods of a formation process. The system can include on-line analytical tools for real time characterization of products or intermediates. The methods and systems can provide for continuous deposition of the nano-scale materials in a random or controlled pattern; for instance, on a substrate that can be moved across a print bed during deposition and/or by use of a movable print bed or print head, i.e., a print bed and print head capable of motion in at least one degree of freedom relative to one another.

BRIEF DESCRIPTION OF THE FIG.s

A full and enabling disclosure of the present subject matter, including the best mode thereof to one of ordinary skill in the art, is set forth more particularly in the remainder of the specification, including reference to the accompanying figures in which:

FIG. 1 schematically illustrates one embodiment of a nano-scale material formation system.

Figures 6, 7:
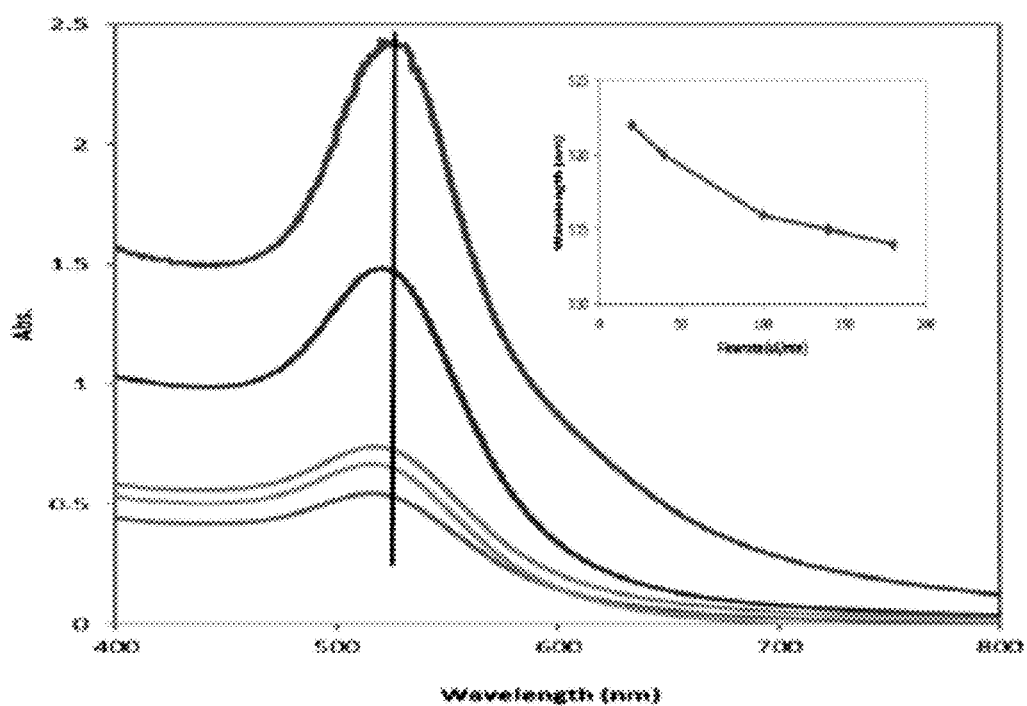

FIG. 6 provides optical properties for nano-scale materials formed as described herein of the same formation materials but formed by use of different fluid flow rates in a formation system.

FIG. 7 illustrates optical properties of nano-scale materials of FIG. 6.

Figure 8:
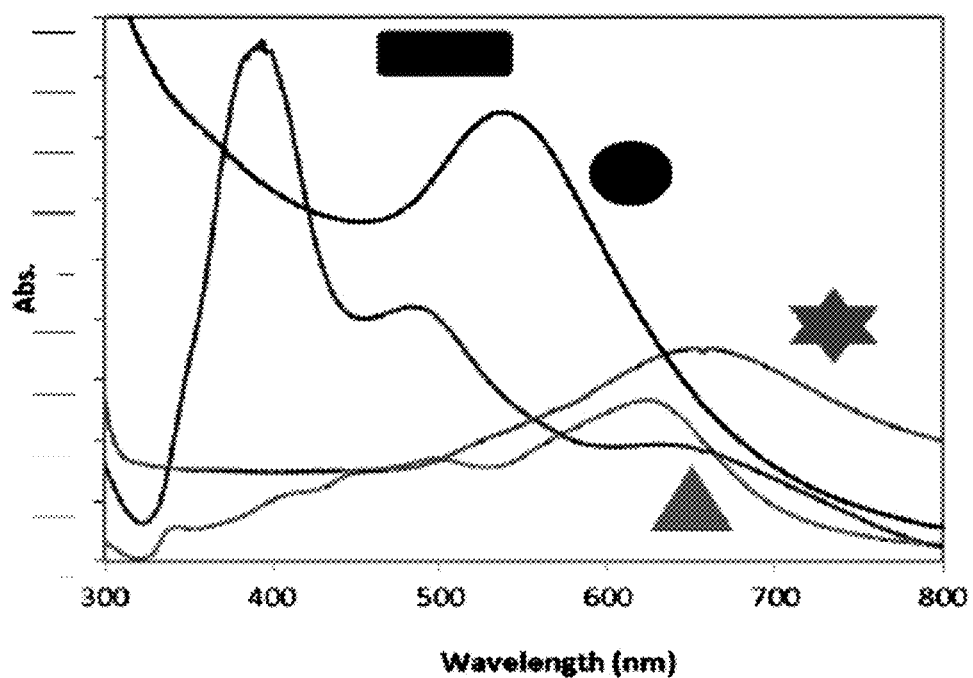

FIG. 8 illustrates the different optical properties of gold and silver nano-scale materials formed as described herein.

Figure 9:
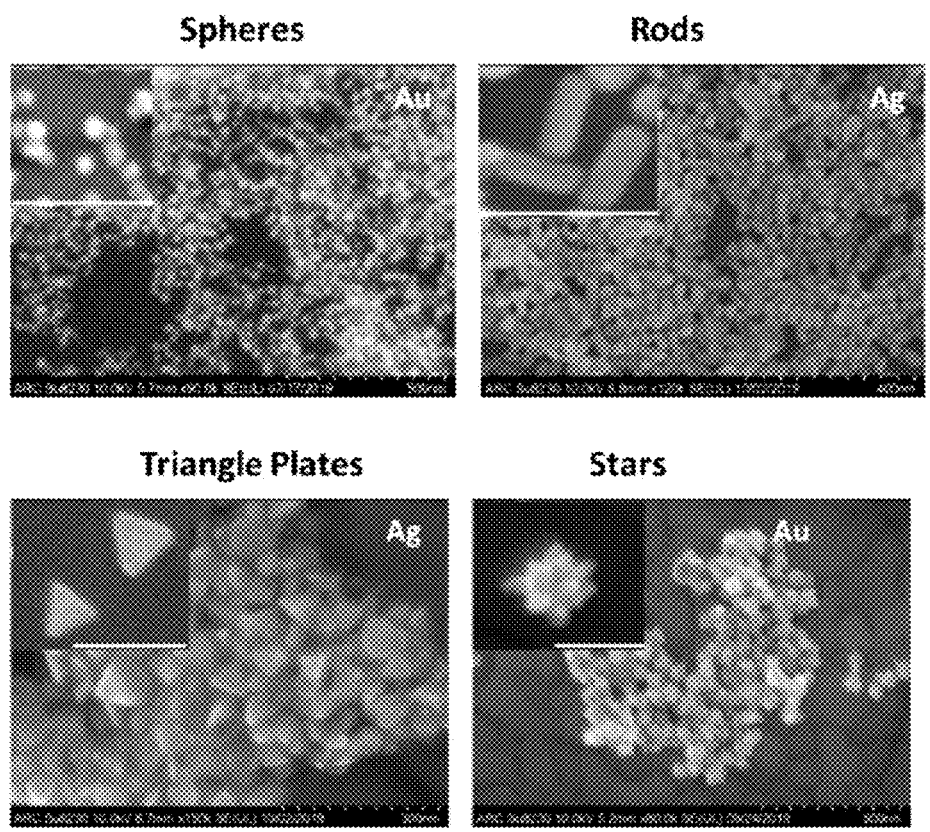

FIG. 9 illustrates different shape nano-scale materials formed by use of disclosed systems and methods.

Figure 10:
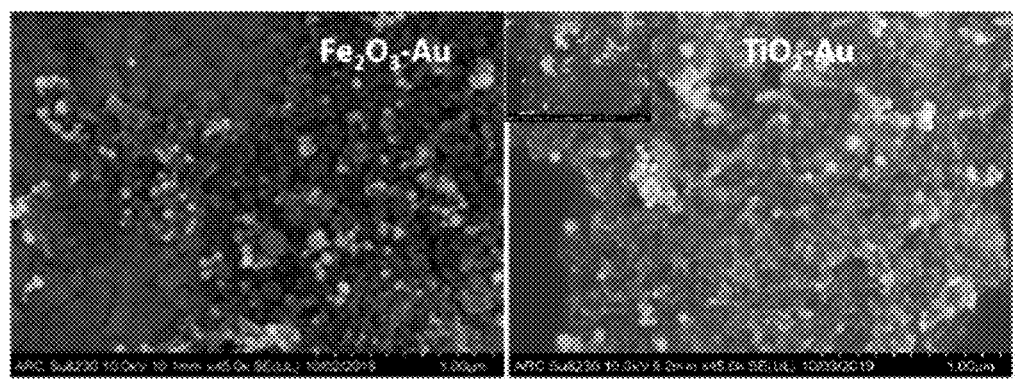

FIG. 10 illustrates hybrid nano-scale materials formed by use of disclosed systems and methods.

Figure 11:
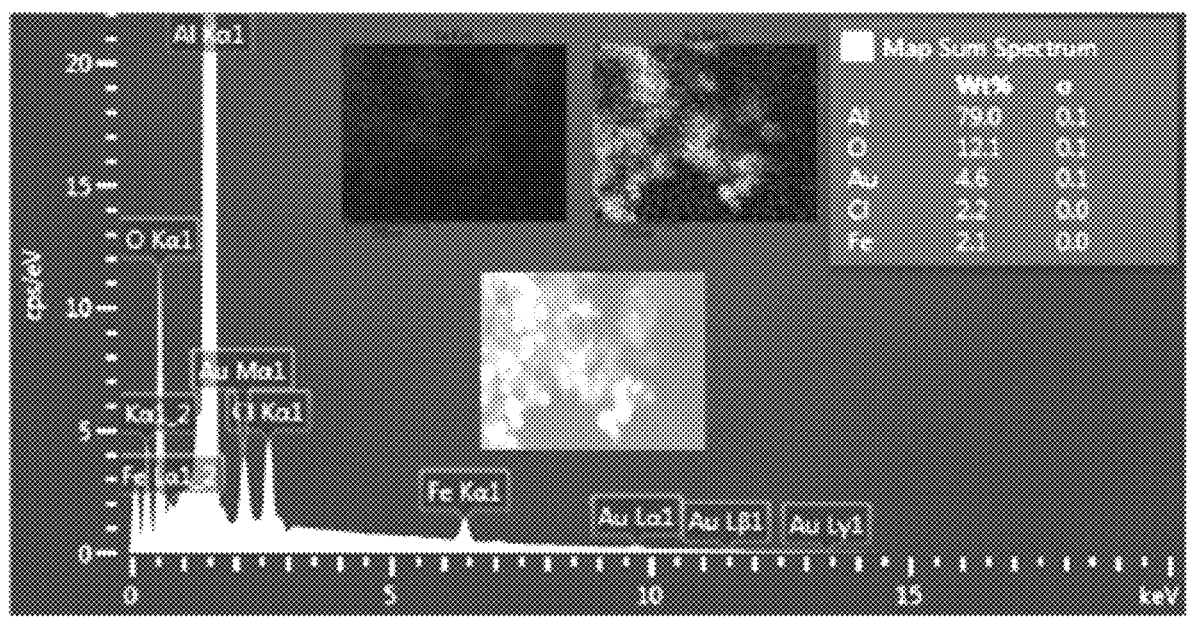

FIG. 11 provides energy-dispersive X-ray spectroscopy and EDS mapping data for Fe$_2$O$_3$—Au nano-scale structures illustrated in FIG. 8.

Figure 12:
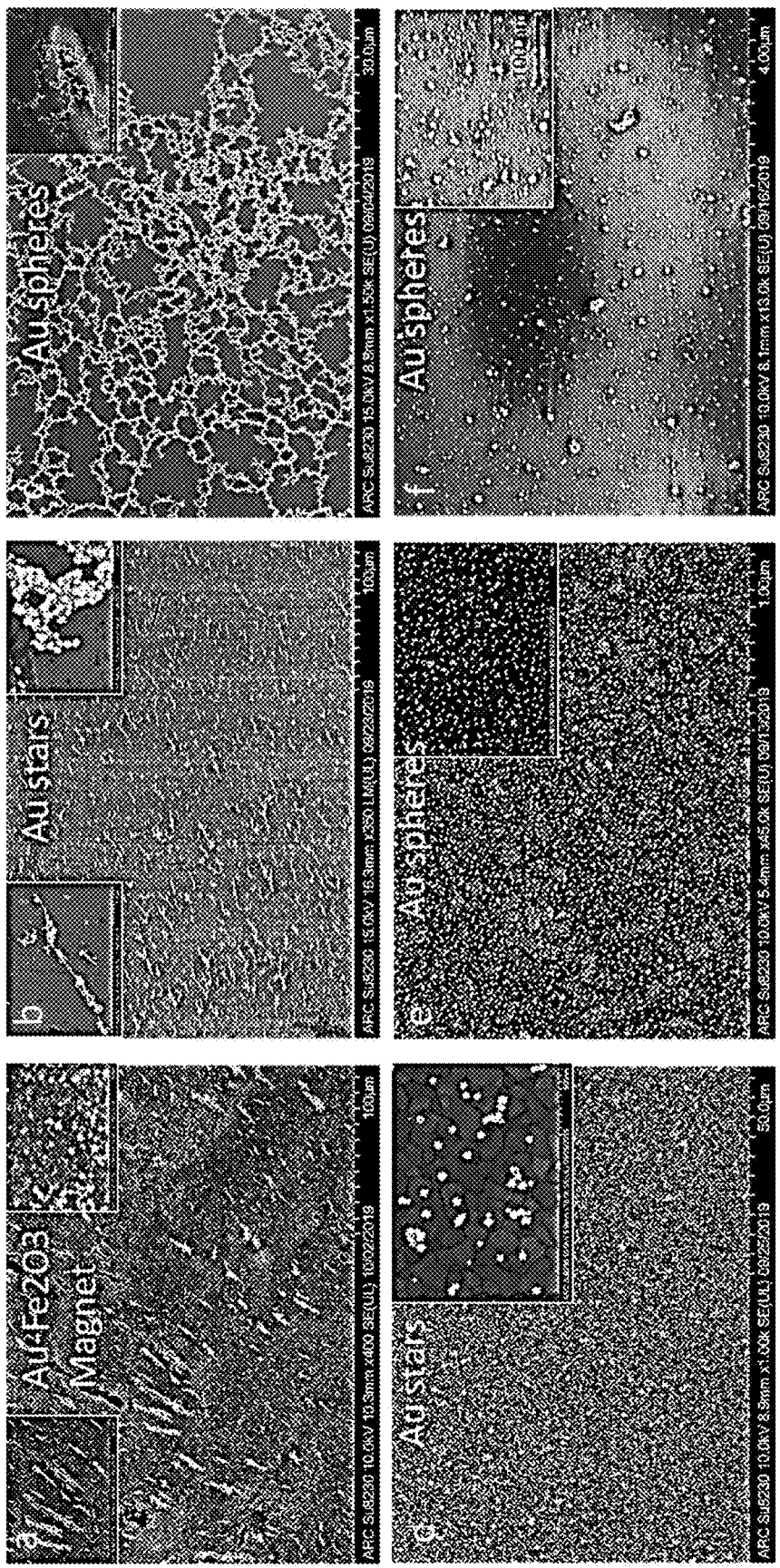

FIG. 12 illustrates patterned deposition examples of different nano-scale materials printed on different surfaces.

Figure 13:
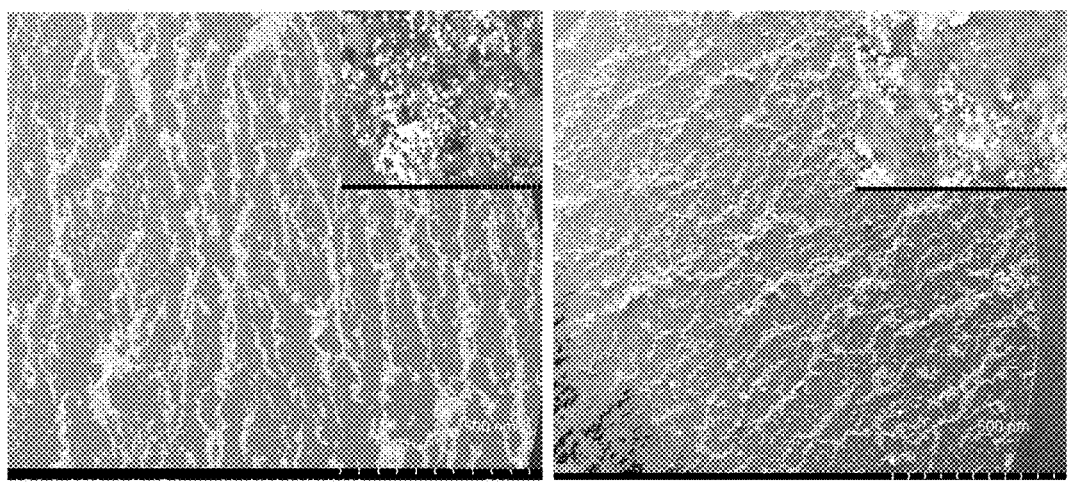

FIG. 13 illustrates substrates printed with Au—Fe$_2$O$_3$ nano-scale structures according on longitudinal recording media (left) and perpendicular recording media (right).

Figure 14:
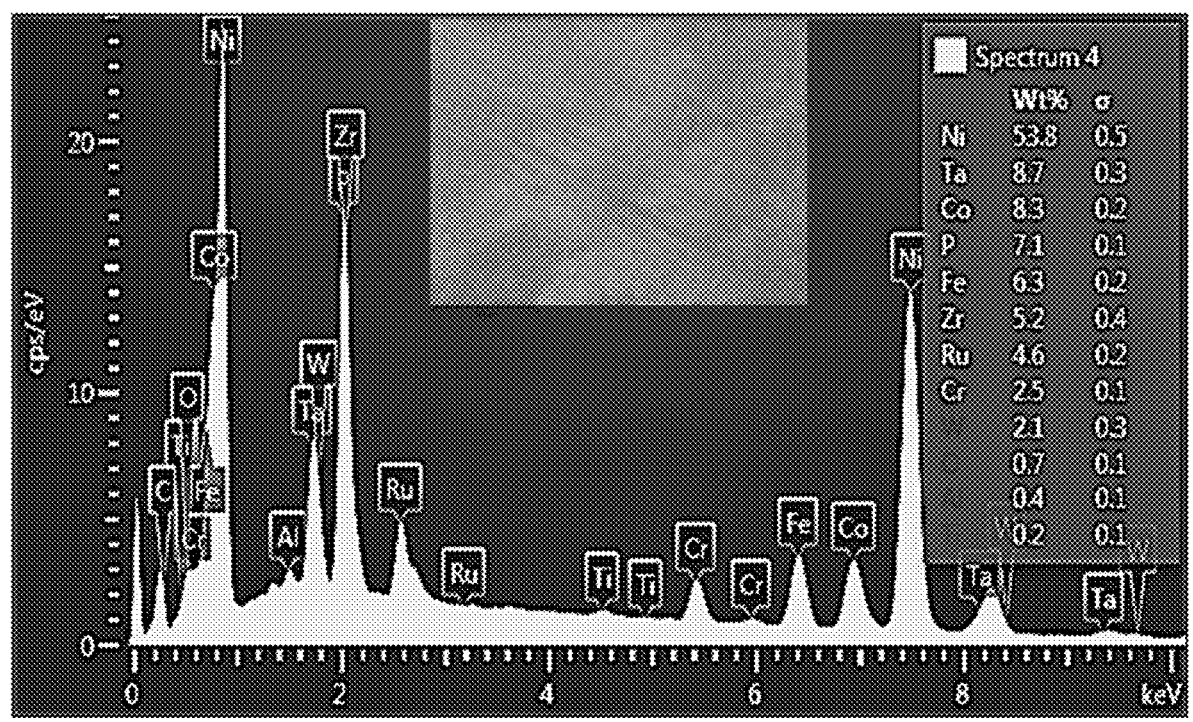

FIG. 14 provides EDS mapping data for a control recording media used in magnetic field directed printing approaches.

Figure 15:
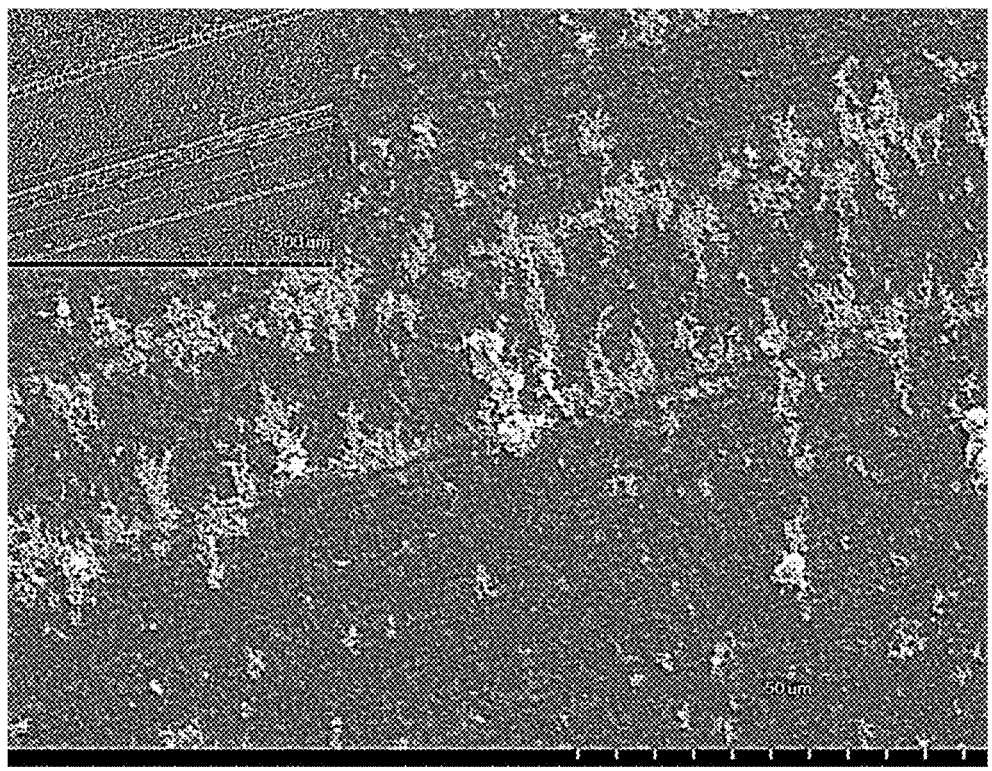

FIG. 15 illustrates a magnetic media printed with a diluted sample of Fe$_2$O$_3$ nano-scale materials.

Figure 16:
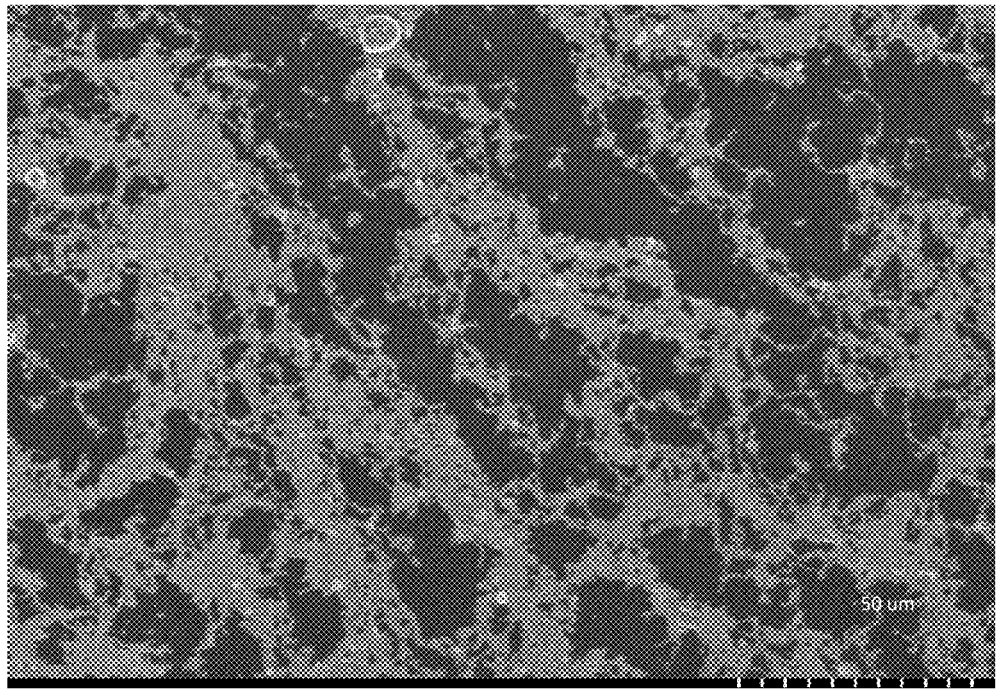

FIG. 16 illustrates a magnetic media printed with a concentrated sample of Fe$_2$O$_3$ nano-scale materials.

Figure 17:
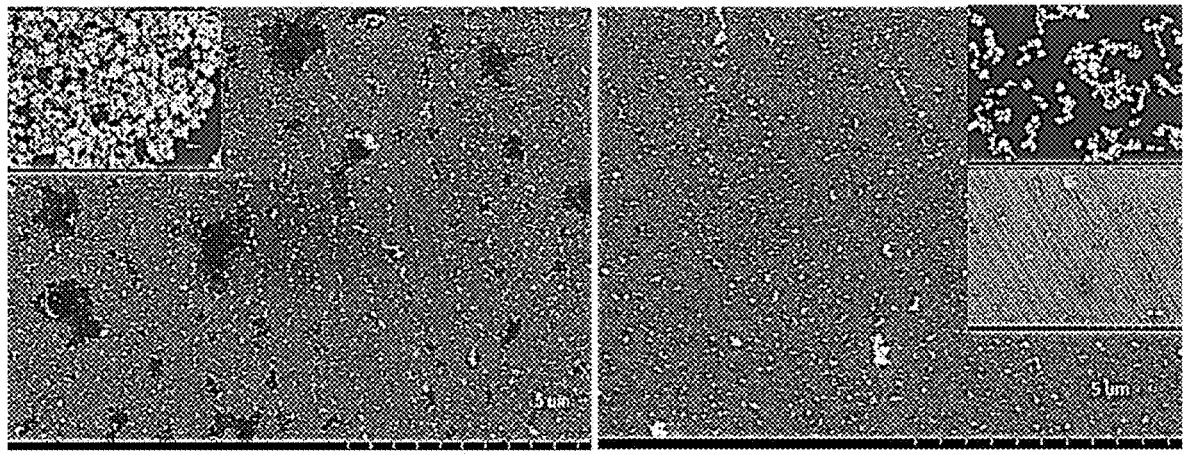

FIG. 17 illustrates magnetic-field directed self-assemblies of hybrid Au—Fe$_2$O$_3$ nano-stars of different sizes on the surface of a patterned magnetic medium.

Figure 18:
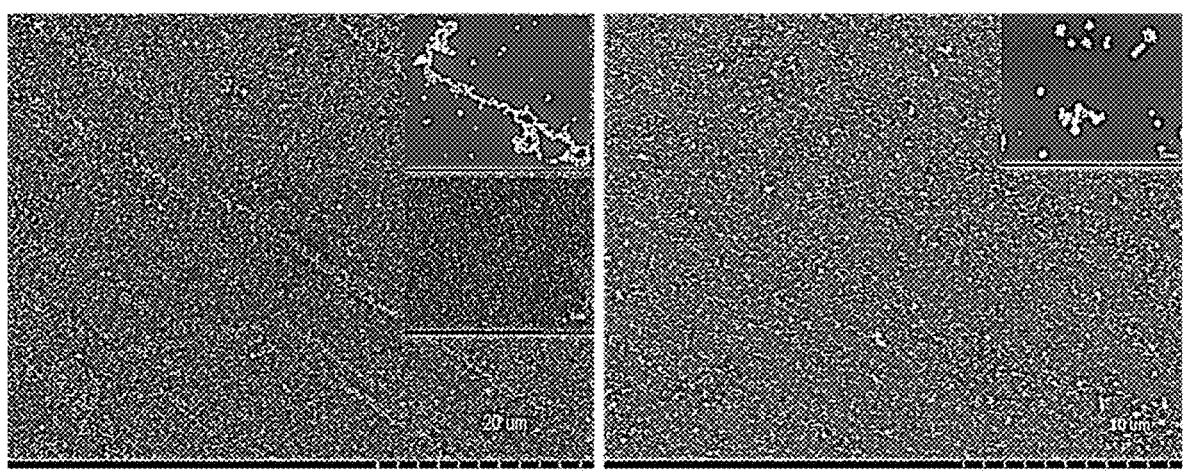
Figure 19:
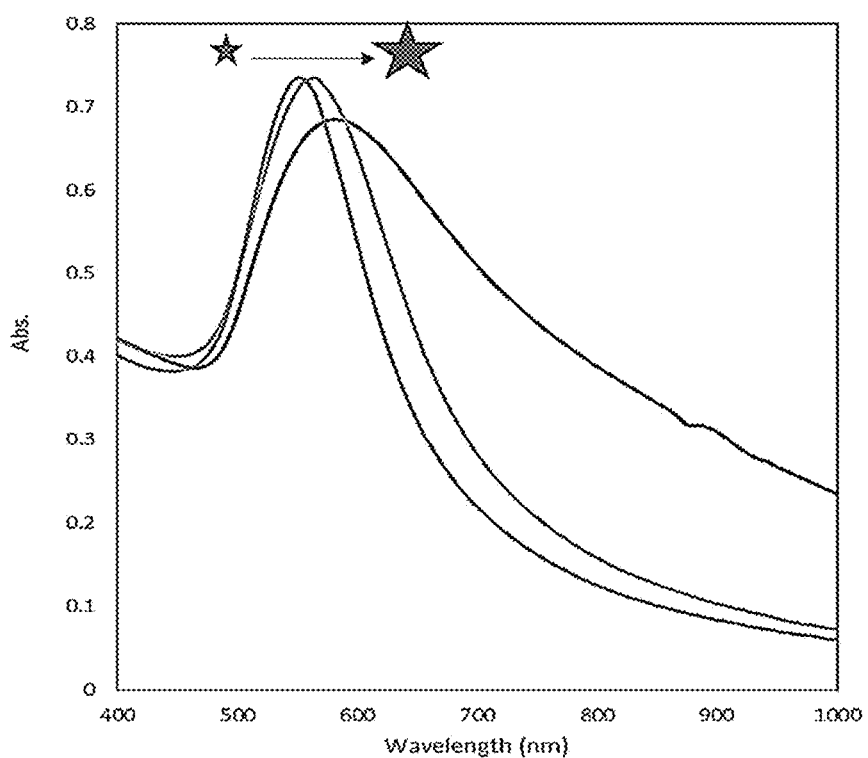

FIG. 18 illustrates magnetic-field directed self-assemblies of Au nano-stars of different sizes on the surface of a patterned magnetic medium FIG. 19 presents absorbance data of the nano-stars of FIG. 9.

Figure 20:
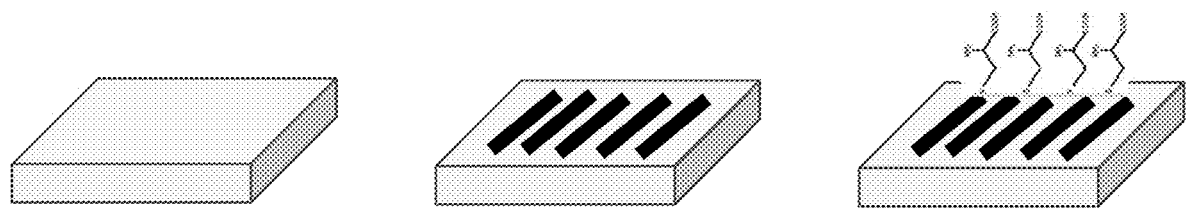

FIG. 20 illustrates one embodiment for forming a patterned substrate by use of a scanning electron microscope-focused ion beam (SEM-FIB) patterned surface and surface functionalization.

Figure 21:
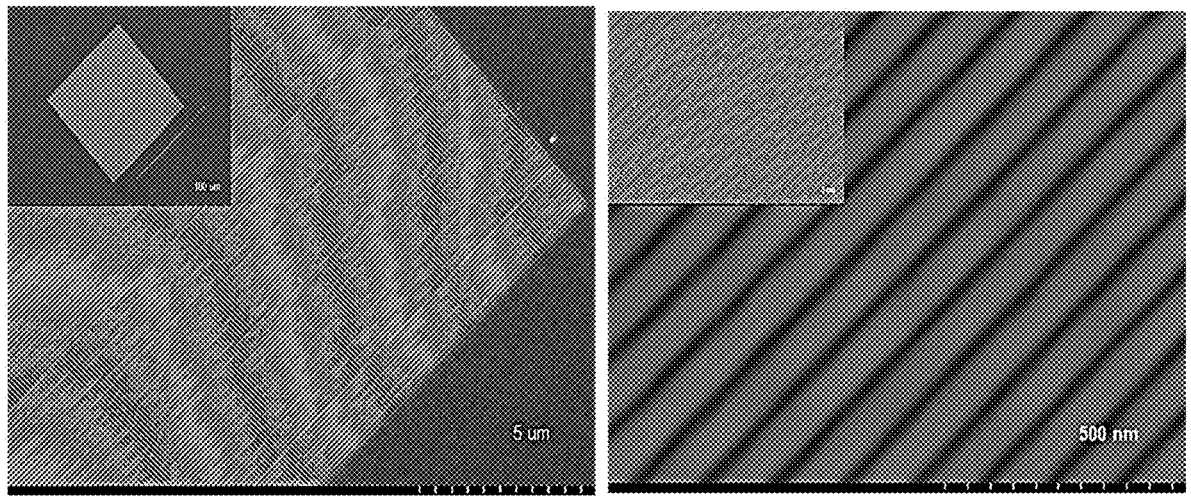

FIG. 21 illustrates patterned gold surfaces prior to functionalization and printing with gold nanospheres.

Figure 22:
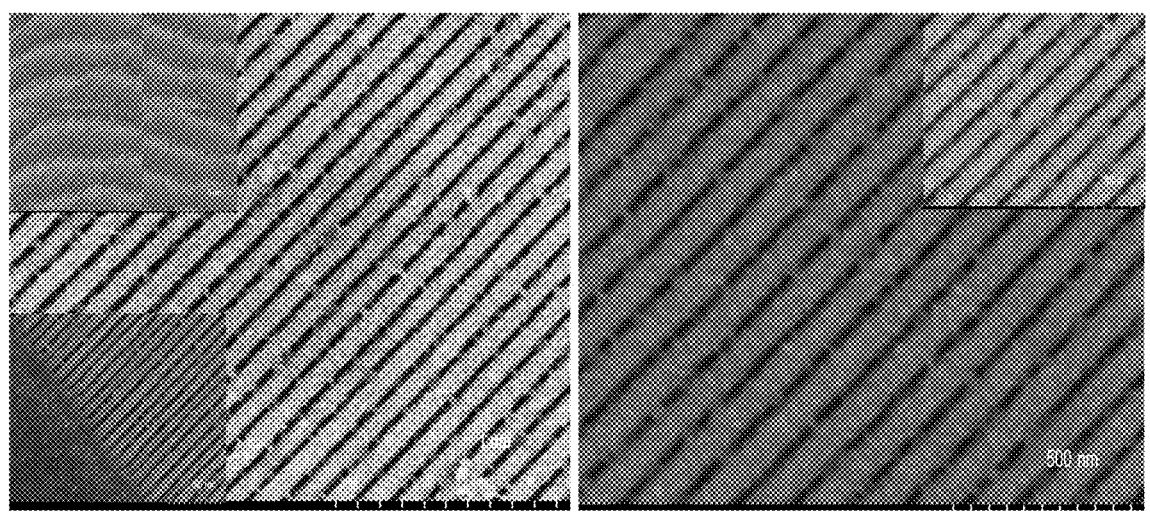

FIG. 22 illustrates the surfaces of FIG. 21 following deposition of gold nanospheres on the surfaces of FIG. 21.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

Disclosed herein are methods and systems that can be used for high speed production of nanoparticles that can produce high quality nano-scale structures with very high product yields, reducing waste through complete or nearly complete reagent consumption as well as reducing formation of waste product. Disclosed systems utilize concentric micro-scale capillaries arranged to provide for one or more well-controlled nanoparticle formation regions that lie along predetermined length(s) of one or more of the capillaries and an additive manufacturing-type deposition at the terminus of the formation section of a system. The deposition area can include a print head and a print bed that provides for random or patterned deposition of nanoparticles on a print bed or on a substrate that can be located on the print bed. In one embodiment, the print head and/or the print bed can be capable of motion in one or more degrees of freedom so as to provide for motion relative to one another.

The systems provide for precise control of reaction parameters and conditions, e.g., fluid flow rates, temperature, pressure, reaction zone volume, pH, ionic strength, etc., within and along all or a portion of the lengths of the micro-scale capillaries, and in particular, along lengths where the nano-scale products are formed. This control capability provides a route for formation of nano-scale materials exhibiting complex designs and arrangements, including complex hybrid and multifunctional nano-scale structures of various shapes (stars, rods, triangles, pyramids, spheres, etc.). Because of the large surface area of the capillaries used to contain the formation reactions, heat transfer can be very efficient, allowing for excellent temperature control and maintenance of, e.g., constant temperature throughout a nanoparticle formation length of a capillary. In addition, the systems provide a route for efficient and localized control of pressure, temperature, and fluid characteristics (e.g., pH, ionic content, etc.). Such excellent control capability improves product characteristics (e.g., monodispersity) and decreases formation of waste product. As such, the systems can be particularly beneficial in processes that involve toxic and/or particularly expensive compounds, as well as for use in challenging reactions, as use of the systems can produce little or no waste.

Figure 1:
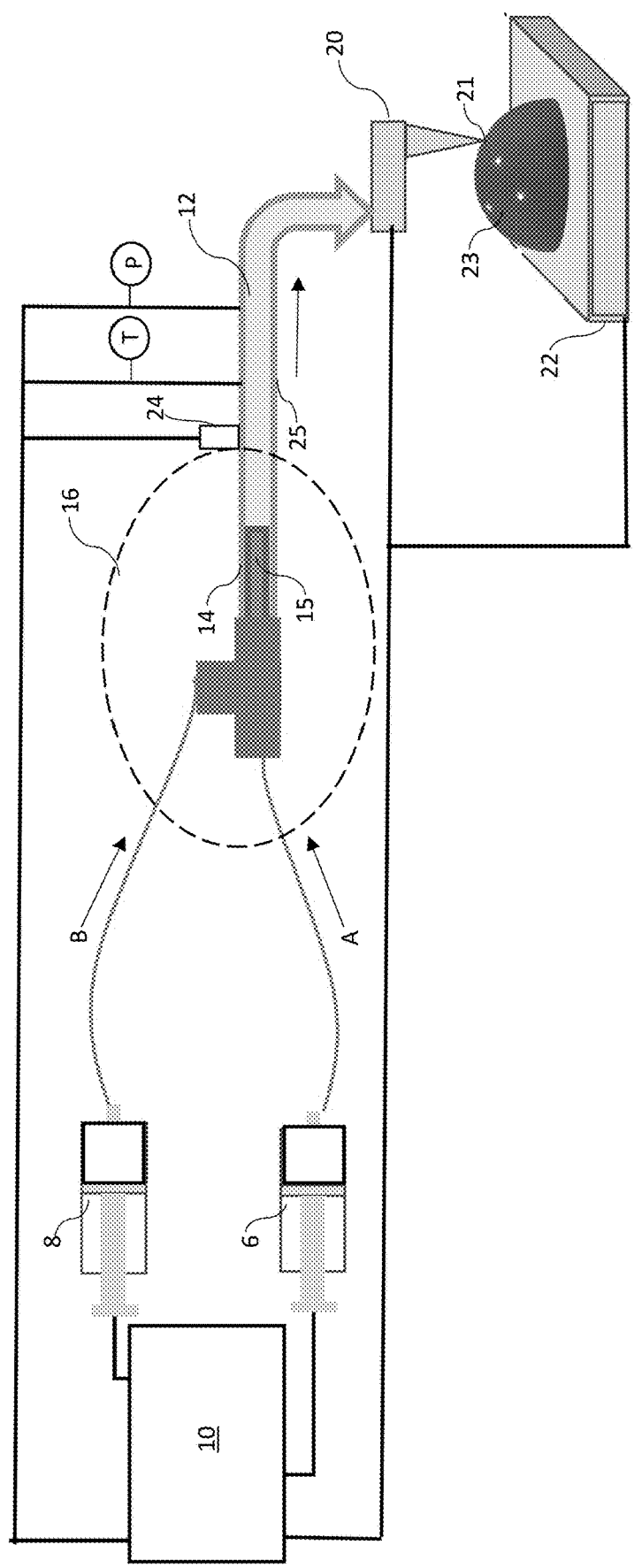

One embodiment of a formation system is illustrated in FIG. 1. A formation system includes multiple capillaries that include capillaries for delivery of reactants to a reaction zone, as well as capillaries (which can be extensions of or different from the delivery capillaries), that define reaction zones within which the nano-scale structures are formed. As illustrated in FIG. 1, a system can include at least one mixing region 12 that includes a length of at least one of the capillaries of the system.

As utilized herein, the term "capillaries" generally refers to hollow tubular structures having an inside diameter of about 1500 micrometers or less, about 1300 micrometers or less, about 1200 micrometers or less, about 1100 micrometers or less, or about 1000 micrometers or less, in some embodiments. For instance, a capillary can have an inside diameter of from about 20 micrometers to about 1500 micrometers, or about 100 micrometers to about 1000 micrometers, in some embodiments. In contrast, the term "tube" is intended to refer to larger tubular structures, i.e., having an inside diameter of about 1500 micrometers or greater. The capillaries of disclosed systems can be formed of nonporous materials that can be non-reactive to reagents, carrier fluids, etc. to be passed through the capillaries. The capillaries can also have relatively smooth inner surfaces that can avoid degradation of laminar flow over the surface. A system will also include capillaries for which flow will be both within and external to the capillary, and the outer surface of these capillaries can likewise be relatively smooth, so as to avoid degradation of laminar flow over the surface. In some embodiments, all capillaries of a system can be composed of the same materials, but this is not a requirement, and in other embodiments, multiple different capillary types and compositions can be utilized.

In one embodiment, a capillary can be composed of a glass, such as a silica glass, a borosilicate, or an aluminosilicate. In some embodiments, a capillary can be composed of a polymeric material, e.g., polyvinyl chloride (PVC), polymethylmethacrylate (PMMA), polytetrafluoroethylene (PTFE), polyimide (PI), polyethylene (PE), and the like. Coated capillaries are also encompassed herein, such as polymer-clad glass capillaries, e.g., polyimide-clad silica capillaries, as are available on the market. Silica capillaries can be utilized in one embodiment as they are known to exhibit broad material compatibility. Use of commercial off-the-shelf silica glass capillaries can reduce overall cost of a system. Silica glass construction also can provide excellent flow stability, system rigidity, and surface quality. Glass capillary construction materials can also be useful in embodiments in which capillaries can exhibit dimensional transitions by thermal tapering along the length of the capillary.

Figure 2:
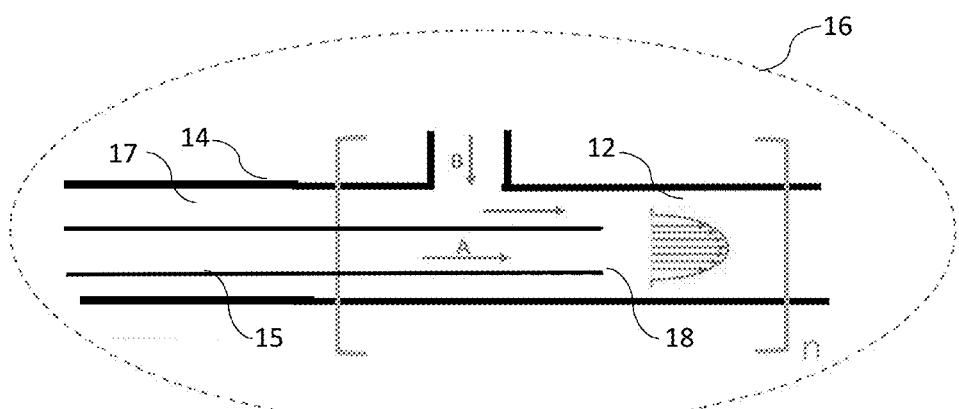
FIG. 2 illustrates a portion of the system of FIG. 1.

A system can include at least one area 16 within which reagents for formation of nano-scale materials are delivered and combined. Area 16 of FIG. 1 is illustrated in more detail in FIG. 2. As illustrated in FIG. 2, an area 16 can include at least two concentric capillaries 14, 15. A first flow A can be provided within the inner of the two capillaries 15. The outer diameter of the inner of the two capillaries 15 is smaller than the inner diameter of the outer of the two capillaries 14, so as to create a flow space 17 between the two capillaries and within the outer capillary 14. Due to the small size of the capillaries 14, 15, upon initiation of flow through the system, the capillaries can be self-centering, and as such, will not require any concentric alignment or support mechanisms as are required in larger, e.g., millifluidic, systems.

As indicated, a first fluid flow A can be delivered through an inner capillary 15 and a second fluid flow B can be delivered through an outer capillary 14. Though illustrated as being fed to the side of the outer capillary, this is not a requirement of a system, and fluid flow can be delivered at any suitable point along the length or at a terminus of any capillary of a system. The inner capillary 15 can include a termination 18 within the outer capillary 14, upon which the contents of the two fluids A, B can continue through the outer capillary 14 along a mixing region 12.

A mixing region 12 can be of any suitable length, generally about 10 centimeters or longer; for instance, up to several meters in some embodiments. The length of a mixing region 12 and the flow rate through a mixing region 12 can be varied to control parameters of a formation process. In particular, the length of a mixing region 12 in combination of the flow rate through the region can define the mixing time, and hence, the reaction time between the reagents of the various fluids. For instance, a longer mixing region 12 can ensure a longer mixing/reaction period, which can lead to better control over the geometry and uniformity of the final nano-scale material, as the longer mixing time can ensure complete reaction of a limiting reagent.

As indicated, the flow along a mixing region 12 can exhibit a laminar flow pattern. A laminar flow pattern is one in which the viscous forces of the fluid dominates and the Reynolds number (Re) is less than about 2000. The Reynolds number represents the ratio of inertial forces to viscous forces and is represented by the following relationships:

$$Re = \frac{\rho u L}{\mu} = \frac{uL}{v}$$

in which:
ρ is the density of the fluid
u is the velocity of the fluid with respect to the capillary
L is a characteristic linear dimension
μ is the dynamic viscosity of the fluid
v is the kinematic viscosity of the fluid The Reynolds number of fluid flow along a mixing region 12 can be about 2000 or lower; for instance, about 1500 or lower, about 1000 or lower, about 500 or lower, or about 100 or lower in some embodiments.

The use of the small concentric capillaries encourages laminar flow within the mixing region 12, which in turn encourages faster and more complete physico-chemical processing of reagents carried in the fluids A and B that interact within the mixing region 12. The faster and more complete processing is understood to be due to the small reaction volumes, which is defined about the interfacial area of the mixing flows along the laminar flow mixing region 12, which facilitates a more efficient thermal and mass transfer, leading to a more efficient formation reaction. Efficient formation of nanoparticles depends upon the ability to control the chemistries and local reaction environment as well as the ability to control the kinetic and thermodynamic factors that can affect the nanoparticle growth including the shape and ultimate size of the nanoparticles. The disclosed concentric capillary based systems provide for such control capabilities.

Referring again to FIG. 1, a system can include pumps 6, 8, that can be used to deliver fluids A, B, respectively, to the concentric capillaries 14, 15, and thence to the mixing region 12. Pumps 6, 8 can deliver their respective fluids A, B to capillaries of a system at any desired flow rate and flow rate control can be utilized to control product characteristics including shape and size of product nano-scale structures as well as surface characteristics, e.g., surface functionality. In general, the flow rate of a fluid in a system can be on the order of nanoliters per minute (nL/min) or microliters per minute (μL/min), e.g., about 10 nL/min or more, about 100 nL/min or more, about 500 nL/min or more, about 1 μL/min or more, about 10 μL/min or more, or about 20 μL/min or more, in some embodiments. Generally, about 1000 μL/min or less, about 500 μL/min or less, or about 100 μL/min or less. While the flow rate through all capillaries of a system can be identical, this is not a requirement of a system, and in some embodiments, flow rate through one capillary can differ from that in others. In addition, flow rate of the entire flow or a component of the flow through a capillary can be varied during a formation process, which can provide another control route for modifying/controlling aspects of a product or the product forming fluid, e.g., pH, etc. For instance, reagent flow through a capillary 14 can be stopped altogether for a portion of a formation process, while reagent flow continues in other areas of a system.

The fluids A, B can carry one or more reagents that, upon interaction in the mixing region, can form or modify a nano-scale material. In some embodiments, a system can include additional mixing regions and/or additional capillaries that can carry additional reagents. As such, the systems can be designed to form any type of nano-size structure, the formation of which includes interaction of two or more different reagents either simultaneously or sequentially. Nanoparticle synthesis approaches can include, without limitation, chemical synthesis techniques such as seed mediated approaches or seedless formation approaches, self-assembly formation approaches, and galvanic displacement reactions; arrested precipitation synthesis techniques; solvothermal synthesis techniques; hydrothermal synthesis techniques; or combinations of formation techniques.

In one embodiment and by way of example, a system can be utilized to form metallic nanoparticles within the mixing region 12 via reduction of a metal salt carried in one of the capillaries by use of a reducing agent carried in another capillary. For example, a first solution A can carry a metal salt, e.g., a nitrate salt, a halogen salt, an oxide salt, etc. in an inner capillary 15, and a second solution B can carry a reducing agent in an outer capillary 14. Of course, the delivery of any particular reagent within an inner or outer capillary is not generally required, and any reagent can generally be delivered to a mixing region 12 in either an inner or an outer capillary. Within the mixing region 12, reagents of the two solutions A, B can interact to form or modify a nano-scale structure.

The metal of metallic nanoparticles that can be formed by use of disclosed systems is not particularly limited, provided a cation of the metal can be carried in a solution to a mixing region 12 and can be reduced by a reducing agent carried in a different solution to the mixing region 12. By way of example, a metal can be a transition metal including, without limitation, chromium (Cr), manganese (Mn), iron (Fe), cobalt (Co), nickel (Ni), or copper (Cu). In one embodiment, the metal can be a transition metal of the platinum group such as platinum (Pt), palladium (Pd), rhodium (Rh), ruthenium (Ru), silver (Ag), or gold (Au). Exemplary metal salts or metal compounds that can be used to deliver the metal of choice to a mixing region 12 can include, without limitation, silver nitrate, chloroauric acid ($HAuCl_4xH_2O$), potassium tetrachloroplatinate (II) ($K_2PtCl_4$), sodium tetrachloroplatinate ($Na_2PdCl_4$), cobalt acetate, manganese chloride, copper nitrate, nickel chloride, iron oxide, etc.

Any suitable reducing agent can be used to reduce the metal and form the metallic nanoparticles including, without limitation, sodium borohydride ($NaBH_4$), hydrazine ($NH_2NH_2$), lithium aluminum hydride ($LiAlH_4$), lithium triethylborohydride ($LiEt_3BH$), ascorbic acid, sodium citrate, alcohols, sugars (fructose, glucose, sucrose), dopamine, N,N-Dimethylformamide, or combinations of reducing agents.

One or both of the capillaries can carry additional supporting materials such as surfactants. Exemplary surfactants can include, without limitation, hexadecyltrimethylammonium bromide (CTAB), Gemini, dendrimers, bifunctional linkers, thiols, amines, ethylene glycol in the presence of poly(vinyl pyrrolidone). In some embodiments, a reducing agent can also function as a surfactant, e.g., CTAB, sodium citrate, polyacrylamide, ethylene glycol.

A seed mediated approach can be used in one embodiment. A seed mediated approach can separate the nucleation and growth stages of a formation. For instance, a seed mediated approach can include delivery of a seed material in a first capillary and delivery of a growth solution (or a component of a growth solution) in a second concentric capillary. Seed material can include, for instance, metal seed particles such as those described above or any other seed particle of interest, e.g., oxides such as silica ($SiO_2$), titania ($TiO_2$), iron oxide ($Fe_2O_3$), zinc oxide (ZnO), alumina ($Al_2O_3$), in conjunction with a suitable metal salt, and a growth solution can include a reducing agent, with one or both solutions, optionally including other components such as surfactants or other stabilizers. For instance, a growth solution can include a reducing agent for a metal salt of a metal of the nanoparticles, a surfactant, and optionally other supporting reagents as are known in the art.

A seed mediated approach can be utilized in one embodiment to form hybrid nanoparticles. For instance, a seed material can differ from a material formed upon interaction of the reagents of the two flows A, B. By way of example, a seed particle can include an oxide, e.g., iron oxide, zinc oxide, or alumina, and this seed particle can be delivered in a first capillary in conjunction with a metal salt (e.g., silver nitrate or chloroauric acid). A second capillary can carry a reducing agent for the metal salt, e.g., sodium borohydride, and within the mixing region a hybrid nanoparticle, e.g., $Fe_2O_3$—Au can be formed.

As mentioned previously, a system is not limited to a single mixing area, and as illustrated in FIG. 2, a system can include multiple (n) sections that include introduction of a fluid B carrying a reagent to a flow space 17 exterior to an inner concentric capillary 15 followed by a mixing region 12.

Figure 3:
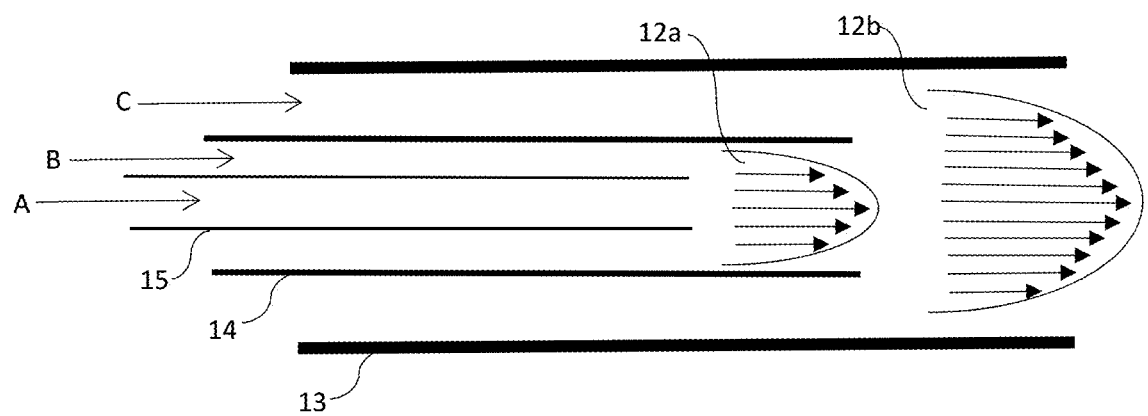
FIG. 3 illustrates multiple mixing regions of one embodiment of a system.

For example, in one embodiment as illustrated in FIG. 3, a system can include multiple concentric capillaries 13, 14, 15. A first fluid A that carries a first reagent can be delivered via inner capillary 15 and a second fluid B that carries a second reagent can be delivered via an intermediary capillary 14. Upon the termination of the inner capillary 15, the reagents carried in fluids A, B can interact in mixing region 12a for a predetermined length (reaction time). At the termination of the intermediary capillary 14, a second mixing region 12b can be initiated along which the resulting product of the first mixing region 12a can interact with reagent(s) in fluid flow C. Such a multi-stage formation process can be utilized to control size/shape of a single material nanoparticle (e.g., a metal nanoparticle in which further mixing regions provide for formation of a larger or differently shaped product) or to form a hybrid nanoparticle. By way of example, a first mixing region 12a can be utilized to form an intermediate particle, e.g., a first metal nanoparticle, and a second mixing region 12b can be utilized to modify that intermediate with a second material, e.g., a capping agent, a passivation agent, etc. to form a hybrid nanoparticle.

As mentioned, any nanoparticle formation process can be carried out by use of disclosed systems, some of which may lend themselves to multi-stage formation processes. For instance, in an arrested precipitation method, a first mixing region 12a can be utilized to encourage the nucleation of particles in an organic solvent and a second mixing region 12b can be utilized to arrest growth and agglomeration of the particles by introduction of a suitable antisolvent. Arrested precipitation can be used in one embodiment to form nano-scale structures of semiconductor material such as silicon and selenium, as well as compound semiconductor materials such as oxides, sulfides, selenides, and phosphides of materials such as cadmium, indium and zinc, examples of which can include, without limitation, CdO, CdS, CdSe, $Cd_3P_2$, $In_2O_3$, $In_2S_3$, $In_2Se_3$, InP, ZnO, ZnS, $Zn_3P_2$ and other compound materials such as lead sulfide (PbS) and lead selenide (PbSe).

A mixing region can be utilized for any desired single or multi-stage reaction chemistry, e.g., sol-gel procedures, solution chemistry formation procedures, etc. For instance, in one embodiment, a sol-gel formation process can be carried out in one or multiple mixing regions by which metal oxide, ceramic, or other nanoparticles can be formed, e.g., $SiO_2$ particles, $TiO_2$ particles, etc. For instance, in a first mixing region, monomers (e.g., a metal alkoxide) carried in solution in a first capillary can be combined with a suitable catalyst carried in a second capillary and can be converted to form a colloidal sol; for instance, via hydrolysis and polymerization (e.g., polycondensation). Following, for instance in a second mixing region, the sol can be further processed, for instance, via precipitation or gelling, to form highly uniform nano-sized particles. A sol-gel formation process may be desirable in certain embodiments; for instance, in forming nano-scale structures of ceramics, as the systems can process materials with a highly uniform distribution within the laminar flow of the mixing regions, which can encourage formation of monodisperse particles.

Solution chemistry processes that can include nucleation and growth under well-defined and controlled conditions are also possible within the concentric capillary systems are also encompassed. For instance, a multi-stage solution chemistry process can be carried out involving multiple mixing stages that can include a first mixing stage within which a metal salt delivered to the mixing stage from a first capillary can be combined with a precipitant carried in a second capillary so as to encourage nucleation. Growth of the nucleated materials can be carried out along the length of the first mixing region and controlled through incorporation of a limiting reagent in the flow or alternatively, through modification of the growth solution in a downstream mixing region, e.g., through modification of the pH or temperature of the growth solution. Other variations and modification of solution chemistry processes as would be evident to one of ordinary skill in the art are likewise encompassed herein.

Additional mixing regions can be included in a system for the addition of capping agents, surface passivation, surface functionalization, etc., or combinations thereof to a particle surface. Addition of a capping agent to a previously formed nanoparticle can be utilized to inhibit further growth of the nanoparticle, as in an arrested precipitation method, or can be utilized to merely modify a previously formed particle. Capping agents can include many organic and inorganic substances, including metals, oxides, polymers, etc., as are known in the art. Polymeric capping agents can be useful in arresting growth of metal nanoparticles, as the polymeric chain can be strongly bound to metal ions near the surface of the nanoparticles. This binding can also encourage electrostatic repulsion between particles and can aide in keeping the nanoparticles apart sterically due to the presence of the polymeric chain. Examples of capping agents can include, without limitation, polymeric capping agents such as polyethylene glycol (PEG), ethylenediaminetetraacetic acid (EDTA), polyvinyl pyrrolidone (PVP) and polyvinyl alcohol (PVA), poly(diallyldimethylammonium chloride) (PDADMAC), polyallylamine hydrochloride (PAH), as well as copolymers such as polyethyleneoxide-polymethyl methacrylate (PEO-b-PMMA) block copolymer.

Surface functionality can be a further modification of initially formed nanoparticles in a further downstream section of a system. Surface functionalization can be useful for targeted deposition of the nanoparticles to a substrate (discussed further herein), for an end-use of the particles (e.g., targeted delivery in a system of use), or for any other useful purpose. Surface functionality as can be incorporated on the surface of a previously formed nanoparticle can include, without limitation, bifunctional linkers (e.g., —SH, —OH, —COOH, —NH+, etc.), (3-mercaptopropyl) trimethoxysilane (MPTMS), (3-aminopropyl) triethoxysilane (APTES), sodium silicate, Titanium(IV) isopropoxide, thiols (sulfur ligands), amines, sodium silicate, aminothiols, hydrazine monohydrate, L-cysteine, thioacetamide, hydrogen peroxide, etc., as well as combinations of different surface functionalization.

Modification of the surface of previously formed nanoparticles, e.g., addition of surface functionality, capping agents (partial or shell), etc. can be carried out in single or multiple steps. For instance, in a first modification step, the surface of a previously formed nanoparticle or the carrier fluid within the capillary can be modified through combination with a reagent, e.g., an acid (hydrochloric, nitric, ascorbic, sulfuric, phosphoric, etc.) or a base (ammonium hydroxide, sodium hydroxide, lithium hydroxide, etc.) in a mixing region and following, the modified mixture can be further processed in another mixing region, during which the surface modification (e.g., addition of surface functionality) can be completed. This modification can be followed by additional modification (e.g., linking of a polymeric capping agent to a previously added surface functionality) to form a further modified nanoparticle and/or controlled nanoparticles assemblies.

Figure 4:
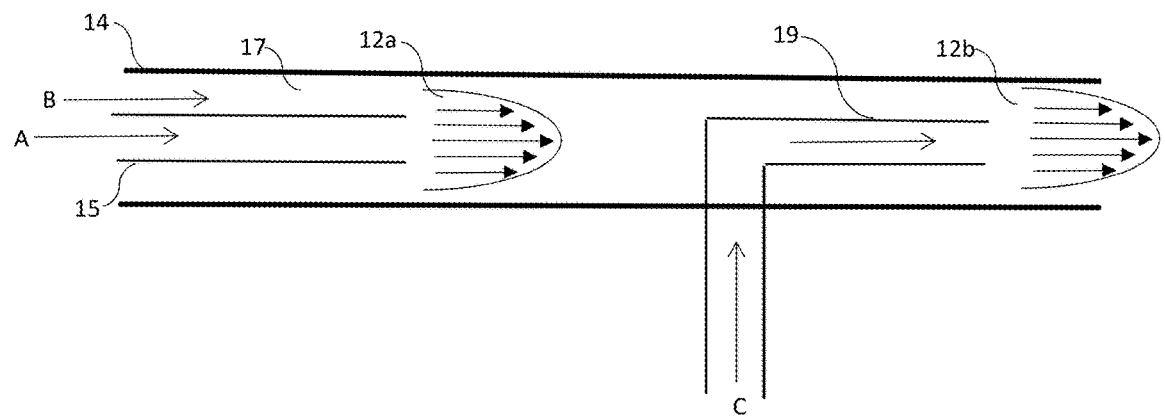
FIG. 4 illustrates multiple mixing regions of another embodiment of a system.

The manner of introducing additional mixing regions within a system is not particularly limited. For instance, in the embodiment of FIG. 3, the concentric capillaries 13, 14, 15 can all extend concentrically for a length, with inner capillaries terminating periodically along the length, thereby providing sequential mixing areas. In another embodiment, illustrated in FIG. 4, following a first mixing region 12a within which reagent(s) carried by flow A in capillary 15 interact with reagent(s) carried by flow B in the flow space 17 of capillary 14, capillary 19 can be introduced to the center of outer capillary 14. A flow C can be delivered to capillary 19 and at the termination of capillary 19 a second mixing region 12b can be established, in which the flow in the mixing region 12b exhibits a laminar flow field, as discussed.

Figure 5:
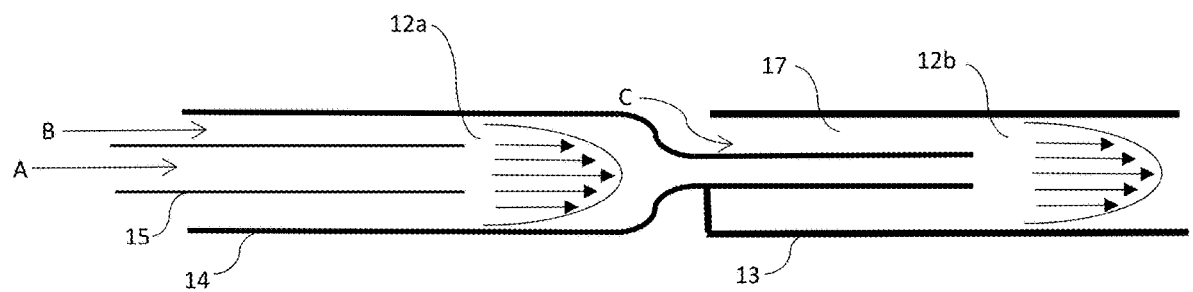
FIG. 5 illustrates multiple mixing regions of another embodiment of a system.

FIG. 5 illustrates another embodiment of sequential mixing areas in a system. As illustrated, downstream of a first mixing area 12a within which the reagents of flow A and flow B, carried in capillaries 14, 15, respectively, have interacted, the outer diameter of capillary 14 can be decreased, as may be brought about by thermal tapering or the like. Following, another capillary 13 can be located so as to be concentric with the resulting smaller diameter capillary 14 and a flow C can delivery additional reagent(s) to the flow space 17 that is internal to capillary 13 and external to capillary 14. Following termination of the now internal capillary 14, a second mixing region 12b can extend within which reagent carried in flow C can interact with the intermediate materials carried in capillary 14.

The input to a capillary system, e.g., flow C in FIG. 5, can in one embodiment be the result of interaction between flows of a parallel system, e.g., a parallel system as illustrated in FIG. 1. Thus, a system can include any number of combinations of parallel and series concentric flows and mixing regions and can provide any number of shapes, sizes and types of nano-scale structures.

Beneficially, a system can also include capability for characterization of a flow at any point of a system. For instance, as illustrated in FIG. 1, a system can include on-line analysis capability 24 that can obtain information from within a mixing region 12 as illustrated or alternatively and/or additionally within one or more capillaries of a deposition system. Any on-line analysis technique can be utilized including, without limitation, chemical analysis techniques, electro-magnetic techniques, NMR analysis, photochemistry/optical analysis, on-line gas chromatography, UV-Vis spectroscopy, etc., as well as combinations of different techniques. As indicated in FIG. 1, in one embodiment, an on-line analysis technique 24 can be in communication with a control system 10, discussed in more detail herein.

Referring again to FIG. 1, following formation of nano-scale structures, the structures can be deposited in an approach based upon an additive manufacturing process. As illustrated, a deposition area can include a print head 20 including a nozzle 21 through which a nano-scale structure 23 can be deposited to a print bed 22.

A deposition system can include components such as actuators as are known in the art that are configured to move the print head 20 and/or the print bed 22 so as to provide motion relative to one another in at least one degree of freedom, e.g., two, three, four, five, six, or more degrees of freedom. As such, the nanoparticles can be deposited in a pattern that can be predefined and instigated by use of a control system 10.

A print bed or a substrate carried on a print bed can be of any suitable material for receiving the nanoparticles. By way of example, nano-scale structures can be deposited on a surface comprising quartz, metal (gold, copper, silver, etc.), metal alloy (steel, stainless steel, bronze, etc.), polymers, ceramic, textile (e.g., wool, silk, cotton, bamboo, etc.) or any other desired material.

A control system 10 can also control other aspects of a system in addition to deposition parameters including, without limitation, flow rates through individual capillaries, temperature at one or more locations along the capillaries of a system, pressure at one or more locations along the capillaries of a system, content of flows within a system, etc. For instance, in one embodiment, a system can include multiple mixing regions, and each mixing region can be subject to independent temperature and pressure control by use of the control system 10. In one embodiment, temperature and/or pressure control can be provided by additional tubes or capillaries 25 that are external to the capillaries carrying reagents and products of the system. Fluid within such external tubes 25 can be used to quickly modify/control the temperature and/or pressure within the capillary section (s) surrounded by the tube 25. Of course, any other suitable temperature/pressure control system can be encompassed.

A control system 10 by which different areas of a system can be held at different conditions from one another can be highly beneficial. For instance, improved heat transfer, and thus, temperature control of disclosed systems, can prevent issues arising in previously known nanoparticle formation methodologies, such as crystallization issues. Similarly, different reaction conditions can be maintained in different areas to encourage desired reaction outcomes in each area. Moreover, improved control can provide for separation of reagent mixing from reaction, which can be beneficial in some embodiments. For instance, a portion of a mixing region can be held at a reaction temperature, which differs from the initial temperature of the mixing region within which reagent mixing can occur. Similarly, pressure in a local area can apply stress within the capillaries, which can induce certain characteristics in the nanoparticles (e.g., stress-induced crystallization, enhanced structural arrangements, etc.). Applied stress during formation can also affect the free-energy of the system, which can allow for tuning the phase or configuration of the nano-scale material, as the surface energy of the particles can play an important role on the phase transformation dynamics.

A control system 10 can include a computer or other suitable processing system that can carry out suitable computer-readable instructions that, when implemented, conFIG. the controller to perform various different functions, such as feeding, heating, pressure control, deposition, etc.

A control system 10 can include a processor(s) and a memory. The processor(s) can be any known processing device. Memory can include any suitable computer-readable medium or media, including, but not limited to, RAM, ROM, hard drives, flash drives, or other memory devices. The memory can be non-transitory. Memory stores information accessible by processor(s), including instructions that can be executed by processor(s). The instructions can be any set of instructions that, when executed by the processor (s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to, application-specific circuits. Memory can also include data that may be retrieved, manipulated, or stored by processor(s).

The system can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the nozzle 21, the print head 20, the print bed 22, the pumps 6, 8, the temperature controllers T, the pressure controllers P, or any combination thereof.

The control system 10 can operate via the software to create a deposition pattern of nanoparticles deposited on a print bed 22 (or on a substrate located on the print bed 22). For instance, the design of a deposition pattern can be provided to a computer utilizing commercially available software. The deposition design can then be reproduced to complete the design of the deposited materials.

Drawing or "casting on" of the nano-scale particles carried in a flow onto the print bed 22 or a substrate located on the print bed 22 can be accomplished by various methods. For example, the flow carrying the nano-scale structures can be connected or adhered to a needle or other type structure that can draw the extrudate from the print head 20 and apply it to the print bed 22. As an alternative, the nozzle 21 of the print head 20 may be brought into contact with the print bed 22, or a substrate thereon, so as to contact the extrudate, whereby the extrudate adheres to the printing bed 22 or a substrate thereon creating an anchor for pulling the extrudate from the print head 20 and depositing the nanoparticles 23 as desired. In another embodiment, the nanoparticles 23 can be deposited on the print bed 22 with no continuous contact of an extrudate between the two.

In some embodiments, a patterned deposition of nanoparticles can be attained by use of directed deposition and/or by use of a substrate that has been processed to adhere to the particles with a preformed pattern. For instance, in one embodiment, the nano-scale structures can be treated to include a surface functionality, as described previously, and a substrate for deposition can be processed to include a binding agent for that functionality in a desired pattern. In another embodiment, an electric or magnetic field can be utilized to control and direct the deposition of nanoparticles that have been formed so as to react to the field in a predetermined fashion. For instance, magnetic particles can be directed to a magnetic surface (or a magnetic pattern formed on a surface) by use of a directed magnetic field. Other directed deposition techniques can include use of patterned surfaces, e.g., SEM-FIB patterned surfaces.

The present invention may be better understood with reference to the Examples, set forth below.

Example 1

Gold nanoparticles were formed by use of a system as schematically illustrated in FIG. 1. The nanoparticles sizes and shapes, as well as optical properties, were tuned by changing the reaction rate by changing the flow rates through the capillaries and modifying the ratio of metal ion ($M^{n+}$) to reducing agent in the mixing region.

The concentric capillaries used had the following dimensions: inner capillary ID=200±6 um; OD=360±10 um;

length 45 cm; and external capillary: ID=400±6 um; OD=794±12 um. Capillaries were either 50 cm or 90 cm in length leading to mixing areas of 20 cm or 35 cm, respectively. The formation reagents included aqueous solution of chloroauric acid and a mixture of sodium borohydride as reducing agent and sodium citrate as capping agent and reducing agent. In another sample, ascorbic acid was used as reducing agent.

The chloroauric acid flow rate was constant through all samples and was 20 ul/min and the reducing agent flow rate was varied as illustrated in FIG. 6. As indicated in FIG. 6, the plasmon peak band varied considerably among the formed gold nanoparticle products. The images on the left of FIG. 6 show the different products in suspension. The different products also had different colors on visual examination. Formation of gold nanoparticles using the same ratio between $M^{n+}$/reducing agent but different flow rates (both 5 μL/min, both 10 μL/min, and both 20 μL/min) also formed products that had different plasmon bands and colors on visual inspection (data not shown). FIG. 6 provides absorbance spectra for the samples. The inset of FIG. 7 shows the relationship between flow rate of the reducing agent and maximum absorbance wavelength of the samples.

Example 2

Silver nanoparticles in the form of rods, spheres or triangular plates and gold nanoparticles in the form of spheres or stars were formed. The nanoparticles sizes and shapes, as well as optical properties, were tuned by changing the reaction rate by changing the flow rates through the capillaries and modifying the ratio of metal ion ($M^{n+}$) to reducing agent in the mixing region.

The formation reagents included silver nitrate and the reducing/capping media included a mixture of sodium borohydride as reducing agent and sodium citrate as reduction/capping reagent. The formation reagent and reducing/capping reagents were introduced in the concentric microfluidic system by means of syringe pumps while ensuring control of the flow rates and residence time. The reactions were performed at room temperature. Residence time and mixing time were controlled by varying the flow rate and capillary lengths. Low flow rates were maintained throughout the entire process as a way of achieving increased interaction between the formation reagents and reducing agents. Specifically, flow rates of 20 ul/min, or 120 ul/min (or other variations) for the reducing agent produced triangular plates or spherical nanoparticles, respectively when silver nitrate flow rate was maintained constant at 20 ul/min. Flow rates of 120 ul/min for silver nitrate solution and 40 ul/min for the reducing agent produced silver nanorods.

The experimental set up was based on flowing solutions through concentric microcapillary assemblies with various dimensions, such as internal (ID) and outer diameters (OD). Specifically, inner capillary dimensions were ID=200±6 um; OD=360±10 um. The external capillary dimensions were ID=400±6 um; OD=794±12 um. Inner capillary length was 45 cm and external capillary was 90 cm. Formation reagents and reducing/capping reagents merged at specific rates (20-120 ul/min) and location (32 cm external capillary) in the concentric capillaries leading to mixing zone with dimensions of 35 cm. Upon contact, the solutions change color (yellow, blue, green, etc.) indicating the formation of nanoparticles.

Gold nanospheres of various dimensions were produced when reducing agent flow rate was varied from 20 ul/min, 40 ul/min, 60 ul/min, 80 ul/min, 100 ul/min, 120 ul/min, 140 ul/min, 160/ul/min, and 180 ul/min for a constant flow rate of 20 ul/min of chloroauric acid. The use of other flow rates produced nanoparticles (both 10 ul/min, etc.). The formation reagents included chloroauric acid while the reducing/capping reagent was a mixture of sodium borohydride as reducing reagent and sodium citrate as reducing/capping reagent. The concentric capillaries dimensions used in these samples were inner capillary: 200±6 um; 360±10 um; length 45 cm; and external capillary: 400±6 um; 794±12 um. Inner capillary length of 45 cm and external capillary of 90 cm were used. Mixing area dimensions were of 35 cm. Various degrees of ruby-red color indicate production of gold nanospheres.

Gold nano-stars were produced by using concentric capillaries with inner capillary dimensions of ID=200±6 um and OD=360±10 um; length 45 cm; and external capillary: ID=400±6 um and OD=794±12 um. The use of and external capillary with a length of 90 cm generated mixing areas of or 35 cm. The formation reagents included chloroauric acid, gold nano-spherical "seeds" (4 nm or 20 nm), additive ions, e.g. silver ions, and an aqueous solution of ascorbic acid as reducing agent. Formation of gold nano-stars with tunable optical properties was achieved using the same ratio between formation reagents mixture/reducing agent but different flow rates. The flow rate for the formation reagents mixture was 100 ul/min while the reduction agent varied as follow: 100 ul/min, 80 ul/min, 60 ul/min, 40 ul/min, 20 ul/min, 10 ul/min formed products that had different optical properties. Other variations in the flow rates produced nano-stars (both solution 20 ul/min, etc.). Upon combination of the formation reagents and reducing agents a color change occurred indication formation of the nanoparticles. Blue solutions indicated formation of gold nano-stars while ruby-red solutions indicate formation of spherical gold nanomaterials. The as-prepared nano-structures were characterized via on-line UV-Vis spectroscopy, SEM, EDS, and EDS mapping.

FIG. 8 presents the absorbance spectra for the different nanoparticles and FIG. 9 provides images of the different materials, with insets showing individual particles and their different morphologies.

Example 3

Hybrid nanoparticles including $Fe_2O_3$—Au particles and $TiO_2$—Au particles were formed. $Fe_2O_3$—Au and $TiO_2$—Au hybrid nanoparticles were prepared by reducing the same amount of $Au^{3+}$ ions in the presence of $Fe_2O_3$ nanoparticles or $TiO_2$ nanoparticles as "seeds." Hybrid nanostructures were produced by using concentric capillaries with inner diameter (ID) of 200±6 um and outer diameter of 360±10 um and length of 45 cm. The external capillary dimensions were ID 400±6 um and OD 794±12 um. The external capillary was 90 cm in length leading to mixing areas of 35 cm in length. Residence time and mixing time were controlled by varying the flow rate and capillary lengths. The flow rate for the formation reagents mixture was 100 ul/min or 50 ul/min while the reduction agent varied as follow: 100 ul/min, 50 ul/min, 20 ul/min. Other flow rates also produced hybrid nanostructures. Different color solutions (red, purple, pink, or a combination of those) indicated the formation of hybrid nanostructures. Gold nanoparticles formed on the surface of the "seed" $Fe_2O_3$ or $TiO_2$ nanostructures as depicted in FIG. 10.

FIG. 10 provides images of the different hybrid nanoparticles and FIG. 11 provides EDS mapping data of the $Fe_2O_3$—Au nanoparticles. The compositions of the different hybrid structures were investigated using energy dispersive X-ray analysis (EDS). EDS analysis of hybrid nanostructure revealed that the reduction reaction occurred, and the resulting product was a hybrid material $Fe_2O_3$—Au and not a mixture of individual nanostructures. EDS mappings depicted the distribution of Au, Fe, and O in the $Fe_2O_3$—Au nanoparticles as shown, and these confirmed $Fe_2O_3$ and Au spherical shape and local distribution.

Example 4

Ligand modified nanostructures were produced by using three concentric capillaries. The internal capillary had the following dimensions: ID=200±6 um and OD=360±10 um and length of 45 cm. The middle capillary dimensions were ID=400±6 um and OD=794±12 um and length of 90 cm. External capillary dimensions were ID=1587.5 um and OD=3175.0 um. Residence time and mixing time were controlled by varying the flow rate and capillary lengths. The formation reagent and reducing/capping reagents were introduced in the concentric microfluidic system by means of syringe pumps while ensuring control of the flow rates and residence time. The formation reagents included chloroauric acid or silver nitrate flown in the inner capillary. The reducing/capping media included a mixture of sodium borohydride as reducing agent and sodium citrate flown through the middle capillary. The combined solutions produced metallic nanoparticles (Au, Ag, etc.) that were further flown through an external capillary containing linkers, e.g. thiol, amine, disulfide, etc., for subsequent surface functionalization. Depending on the nanomaterials produced, e.g. metal oxides ($SiO_2$, $Fe_2O_3$, $TiO_2$,) or quantum dots (CdS, CdSe, etc.), other chemistries could be employed for surface functionalization. The flow rate for surface functionalization varied from 100 ul/min to 10 ul/min.

Direct surface functionalization was achieved by using a dual concentric capillary microfluidics system. The formation reagents included a mixture of chloroauric acid and bifunctional linkers (MPTMS, ATES, thioacetamide, etc.), thiols or amines, e.g. L-cysteine, while the reducing agent included ascorbic acid. The formation reagents flow rate was constant, 20 ul/min, while the reducing agent flow rate varied from 20 ul/min, 50 u/min, 100 ul/min. Other flow rates could be used for controlled surface functionalization. Ligand-modified nanostructures were produced by using concentric capillaries with inner diameter (ID) of 200±6 um and outer diameter of 360±10 um and length of 45 cm. The external capillary dimensions were ID=400±6 um and OD-794±12 um. The external capillary was 90 cm in length leading to mixing areas of 35 cm in length. Other capillary dimensions could be employed for surface functionalization.

Example 5

Nano-scale materials including $Fe_2O_3$—Au hybrid nanoparticles and gold particles of various shapes produced via the concentric capillaries systems were printed on various surfaces through surface functionalization or under a magnetic field. Nanoparticle printing was attained by a continuous directed deposition in a random or controlled pattern through a printing head placed adjacent to the surface. The support stage could be manually/automated moved while printing head could be fixed. Printing stage could move in XYZ directions in controlled manners. Results are shown in FIG. 12-FIG. 21.

FIG. 12 depicts a series of scanning electron microscopy images containing printed nanomaterials on various supports: (a, b) $Fe_2O_3$—Au hybrid nanoparticles and Au nano-stars printed on aluminum supports under a magnetic field (neodymium magnet); (c) Au nanospheres functionalized with 3-(Aminopropyl)triethoxysilane printed on quartz support through surface functionalization; (d-e) Au nano-stars and Au nanospheres functionalized with L-Cysteine and printed on gold films deposited on quartz slides; (f) Au nanospheres functionalized with 3-(Aminopropyl)triethoxysilane printed on quartz support through surface functionalization.

FIG. 13 depicts ordered arrays assemblies of hybrid Au—$Fe_2O_3$ nanospheres produced in the concentric capillary system and directly printed on magnetic hard-drive support.

FIG. 14 depicts electron microscopy image and EDS analysis on the control, e.g. no nanomaterials, magnetic hard drive support.

FIG. 15 shows SEM images of $Fe_2O_3$ printed on magnetic hard drive supports in one-dimensional patterned assemblies.

FIG. 16 shows SEM images $Fe_2O_3$ printed on magnetic hard drive supports in one- and two-dimensional architectures.

FIG. 17 shows SEM images of hybrid $Fe_2O_3$—Au nano-stars printed on magnetic hard-drive in one-dimensional architectures obtained in various experimental conditions, e.g. flow rates.

FIG. 18 shows SEM images of Au nano-stars of various sizes printed on magnetic hard-drive in one-dimensional architectures (parallel line patterns) obtained in various experimental conditions, e.g. different flow rates.

FIG. 19 shows optical properties of gold nano-stars of various dimensions. Plasmon band (plasmon peaks), e.g. collective oscillations of electrons, shifts to the red region of the spectrum with increasing the nano-stars dimensions, 30-60 nm in diameter.

FIG. 20 is a schematic describing pattern formation and surface functionalization of gold or silver films deposited on quartz slides with bifunctional linkers, e.g. APTES.

FIG. 21 shows SEM images of patterns created on gold films with SEM-FIB.

FIG. 22 shows SEM images of Au nanospheres printed on patterned gold surfaces through the use of bifunctional linker, l-cysteine.

While certain embodiments of the disclosed subject matter have been described using specific terms, such description is for illustrative purposes only, and it is to be understood that changes and variations may be made without departing from the spirit or scope of the subject matter.

What is claimed is:

1. A method for manufacturing nano-scale materials comprising:
   flowing a first fluid carrying a first reagent through a first flow space of a first capillary, the first flow space being external to a cylindrical length of a second capillary that is concentric with and internal to the first capillary;
   flowing a second fluid carrying a second reagent through a second flow space of the second capillary, the second capillary having an end that is the termination of the cylindrical length and that is within the first capillary;
   wherein the first fluid and the second fluid, upon passing the end of the second capillary, pass into a first mixing region, wherein the first fluid exhibits a laminar flow pattern through the first flow space and the first mixing region and the second fluid exhibits a laminar flow pattern through the second flow space and the first mixing region, the first and second reagents interacting within the first mixing region to form a nano-scale material;

flowing a third fluid carrying a third reagent through a third flow space of a third capillary, the third capillary being external to and concentric with a cylindrical length of the first capillary and the cylindrical length of the second capillary, wherein the nano-scale material within the first mixing region flows past a termination of the first capillary and thereupon passes into a second mixing region, wherein the third fluid exhibits a laminar flow pattern through the third flow space and the second mixing region and the flow exiting the first mixing region exhibits a laminar flow pattern through the second mixing region, the third reagent modifying the nano-scale material; and depositing the modified nano-scale material from a print head to a print bed.

2. The method of claim 1, the modification of the nano-scale material comprising the addition of a capping agent, a functionalization, or a passivation agent to a surface of the nano-scale material.

3. The method of claim 1, further comprising flowing the modified nano-scale material through one or more additional mixing regions to further modify the nano-scale material.

4. The method of claim 1, the first reagent or the second reagent comprising a metal ion and the other of the first reagent and the second reagent comprising a reducing agent.

5. The method of claim 1, the first fluid or the second fluid comprising a seed particle.

6. The method of claim 1, wherein the interaction in the first mixing region comprises a chemical reaction, a precipitation reaction, the arresting of a precipitation reaction, a hydrothermal synthesis, or a solvothermal synthesis.

7. The method of claim 1, wherein the nano-scale material is deposited according to a patterned deposition.

8. The method of claim 7, wherein the patterned deposition is controlled by a control system in communication with the print head.

9. The method of claim 7, wherein the patterned deposition is controlled according to a pattern on the print bed.

10. The method of claim 7, wherein the patterned deposition is controlled by an external magnetic or electric field.

11. The method of claim 1, wherein upon establishment of the flow of the first fluid and the flow of the second fluid, the second capillary self-centers within the first capillary.

12. The method of claim 1, wherein the first mixing region and the second mixing region are at different temperatures.

13. The method of claim 1, wherein the first mixing region and the second mixing region are at different pressures.

14. The method of claim 1, further comprising examining one or more of the first fluid, the second fluid, the third fluid, or the nano-scale material within the first capillary, the second capillary, the third capillary, the first mixing region, or the second mixing region.

15. The method of claim 14, wherein the examining comprises a chemical analysis technique, and electro-magnetic technique, an NMR analysis, a photochemistry/optical analysis, an on-line gas chromatography, or UV-Vis spectroscopy.

16. The method of claim 1, the modification of the nano-scale material comprising addition of a linker to the nano-scale material.

17. The method of claim 16, the linker comprising a thiol, an amine liker, a disulfide, a carboxyl, a hydroxyl, (3-mercaptopropyl) trimethoxysilane (MPTMS), (3-aminopropyl) triethoxysilane (APTES), sodium silicate, Titanium(IV) isopropoxide, an aminothiol, hydrazine monohydrate, L-cysteine, thioacetamide, hydrogen peroxide, or a combination thereof.

18. The method of claim 16, the linker comprising a bifunctional linker.

19. The method of claim 1, wherein the nano-scale material is non-spherical.

20. The method of claim 3, the one or more additional mixing regions being associated with one or more additional capillaries that are concentric with, parallel to, or in series with the first, second, and third capillaries.

* * * * *